Dec. 17, 1963     T. J. HARRIS ETAL     3,114,292
PORTABLE ROUTER
Filed Aug. 2, 1961     5 Sheets-Sheet 1
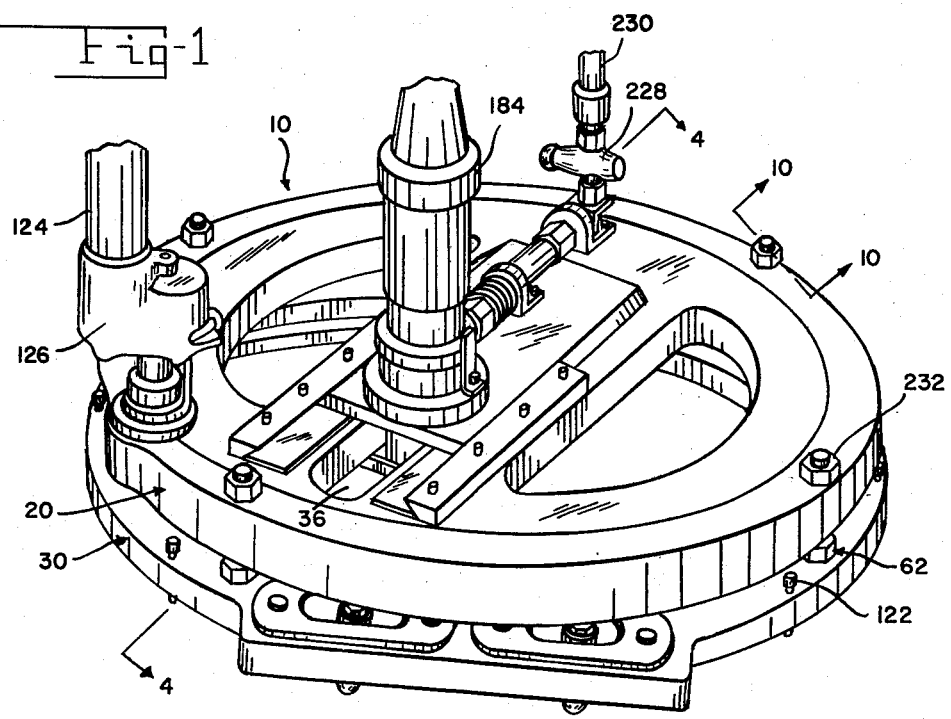
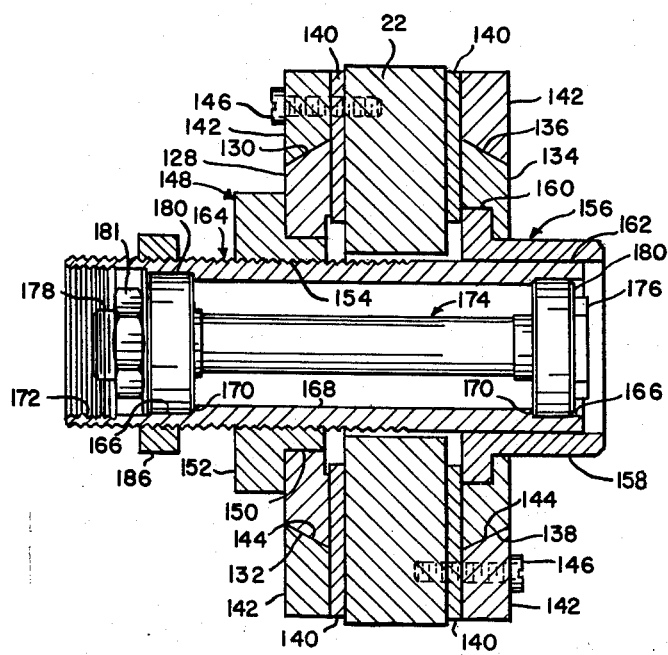
INVENTORS
THOMAS J. HARRIS
LEON A. BROWN
BY
ATTORNEYS

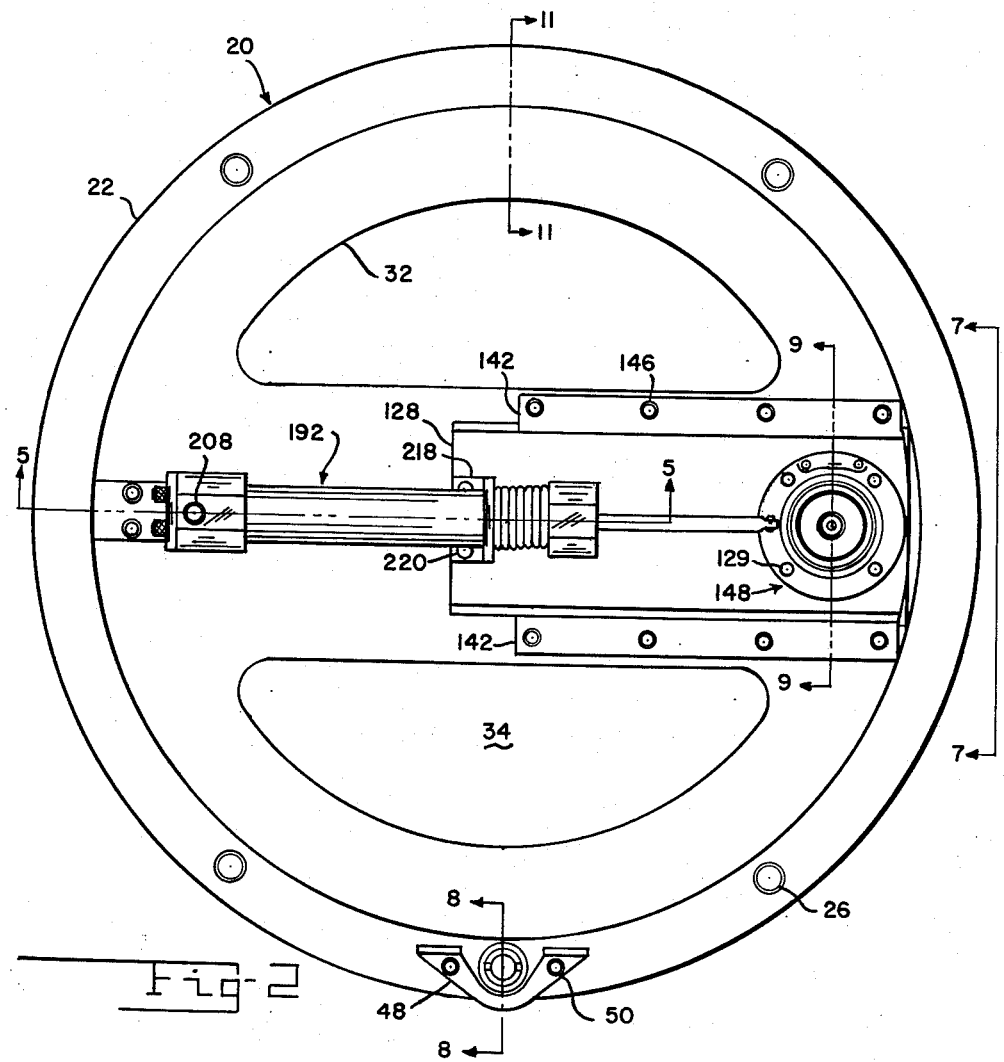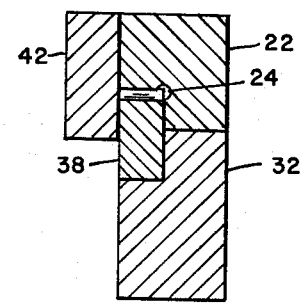

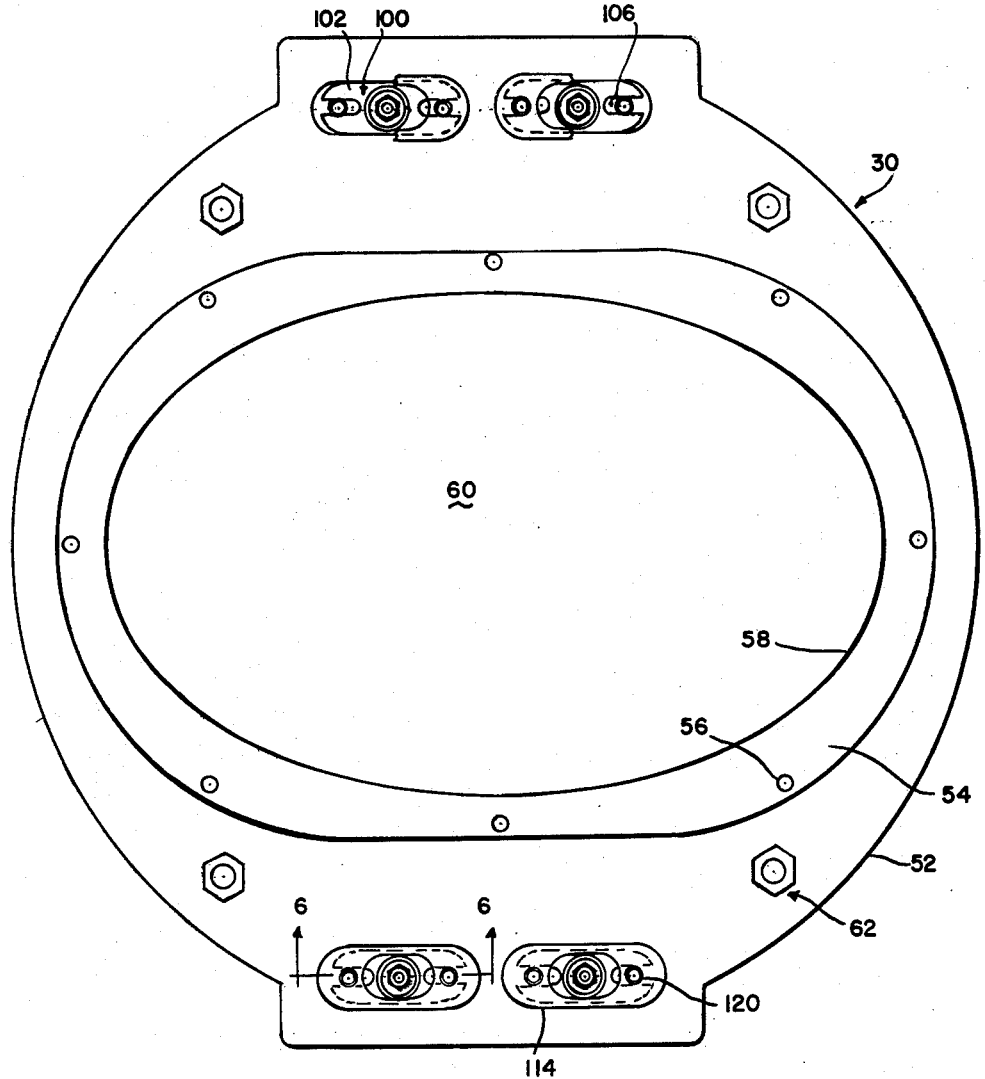

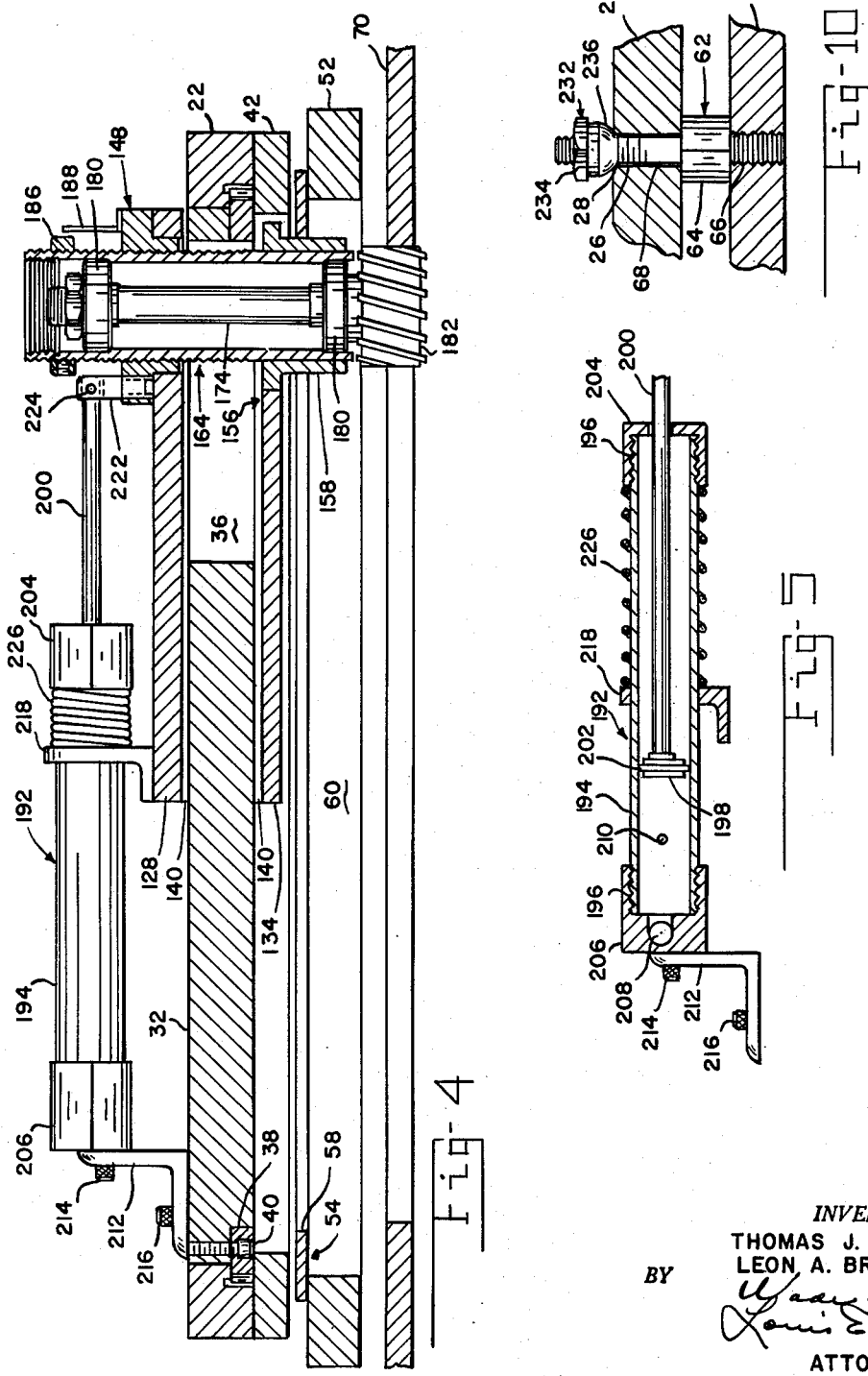

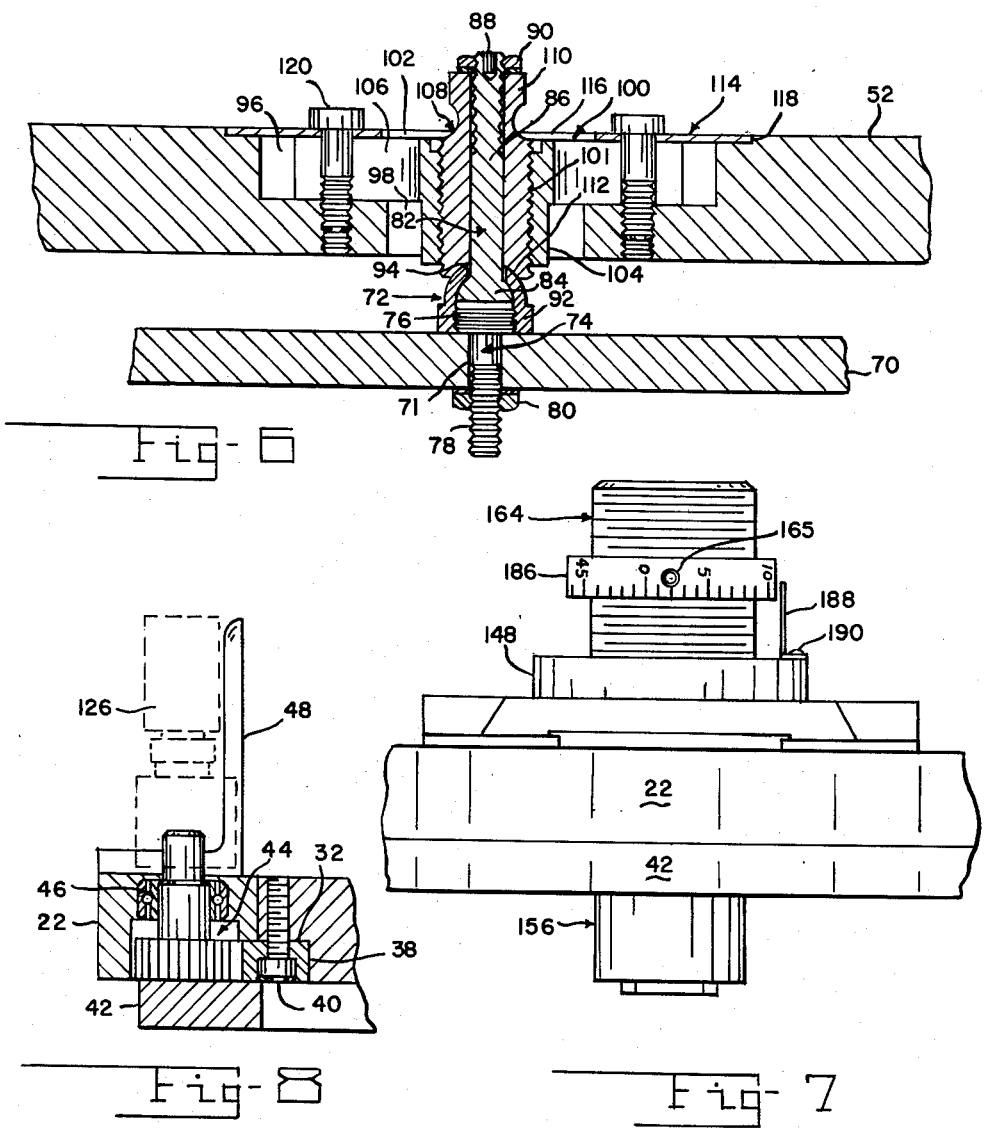

United States Patent Office 3,114,292
Patented Dec. 17, 1963

3,114,292
PORTABLE ROUTER
Thomas J. Harris, 33 SE. 35th St., Oklahoma City, Okla., and Leon A. Brown, R.R. 4, Chandler, Okla.
Filed Aug. 2, 1961, Ser. No. 128,902
6 Claims. (Cl. 90—13)
(Granted under Title 35, U.S. Code (1952), sec. 266)

The invention described herein many be manufactured and used by or for the Government for governmental purposes without the payment to us of any royalty thereon.

This invention relates to that broad class of metal working tools known as routers or milling machines. More specifically this invention relates to those machines in which the contour of the finished cut is established by means of templates which guide and control the cutting tool during the cutting operation.

The embodiment of the invention disclosed by the following drawings and specification is used for forming holes or openings in curved or contoured surfaces on airplane wings. The same embodiment may be used on plane surfaces; however, a simplified modification as will be described in the specification may be substituted.

It is often necessary to perform machine operations on structures such as airplanes, pressure vessels, ships and other large structures which are too large to be handled by the machine tools normally employed to perform such machine operations. In such cases it is often necessary to disassemble a portion of the structure in order to place the part to be altered into the machine, or as an alternative, to attach a portable machine tool to the intact structure.

One object of this invention is to provide a lightweight portable router or milling machine capable of machining openings in curved or contoured surfaces.

Another object of this invention is to provide a router in which cutters and templates may be interchanged without disturbing the alignment between the router and the work piece.

A further object of this invention is to provide a router which may be adjustably mounted to a curved or contoured work surface.

Still another object of this invention is to provide a router or milling machine with depth adjustment to control the depth of vertical cuts.

Additional objects, advantages and features of the invention reside in the construction, arrangement and combination of parts involved in the embodiment of the invention as will appear from the following description and accompanying drawings, wherein:

FIG. 1 is a perspective of the router comprising the fixture assembly and the plate assembly;

FIG. 2 is a plan view of the fixture assembly;

FIG. 3 is a plan view of the plate assembly;

FIG. 4 is a sectional elevation through line 4—4 of FIG. 1 showing the router in operation with the template guide ring engaging the template and the cutter engaging the work piece;

FIG. 5 is a sectional elevation through line 5—5 on FIG. 2 showing the cylinder assembly in its free position;

FIG. 6 is a sectional elevation through line 6—6 of FIG. 3 showing the swivel mounts for attaching the plate assembly to the work piece;

FIG. 7 is a partial end elevation along line 7—7 of FIG. 2 showing the graduated depth adjusting means;

FIG. 8 is a sectional elevation along line 8—8 of FIG. 2 showing the pinion drive in engagement with the ring gear;

FIG. 9 is a sectional elevation along line 9—9 of FIG. 2 showing the drive spindle and slide in cross section;

FIG. 10 is a sectional elevation along line 10—10 of FIG. 1 showing means for locating and holding the fixture assembly on the plate assembly; and FIG. 11 is a sectional elevation along line 11—11 of FIG. 2.

Referring to FIG. 1 router 10 is composed of two primary subassemblies, the fixture assembly 20 as shown on FIG. 2 and the plate assembly 30 as shown on FIG. 3.

Referring to FIG. 3 and FIG. 4 plate assembly 30 has a leveling plate 52 made of magnesium or other lightweight material which supports template 54 by means of screws 56. Template 54, which is preferably made of steel, has an internal cut-out with contoured edge 58 of the same general shape as the hole to be generated in the work piece in a manner to be described hereafter. Template 54 is one of a series of templates use to generate various size and shape holes and which may be attached to leveling plate 52 by means of screws 56. The templates may be "fool-proofed" by means of a "fool-proof pin" which is not shown, but is well known to the art and is not claimed as included in this invention. Leveling plate 52 has a hole 60 in its midportion which is somewhat larger at all points than the contoured edge of the various templates to be used, as shown on FIG. 4. Joined to the leveling plate 52 are locating bolts 62 as shown on FIG. 1, FIG. 3 and FIG. 10 whose purpose will be described hereafter.

Leveling plate 52 is attached to the work piece or curved skin 70 of the airplane wing by means of swivel mounts as shown on FIG. 6. Swivel bolt 72 is composed of attach bolt 74 and spherical head bolt 82 which are held together by acorn nut 92. Attach bolt 74 consists of a threaded head 76 and a threaded shank 78 which engages the work piece 70 through existing rivet holes 71 where it is held in place by nut 80. Nut 80 is screwed in place and tightened through an existing adjacent hole in the skin, which hole is to be enlarged and remachined by the router which is the subject of this invention. The spherical head bolt 82 consists of a spherical head 84 attached to threaded shank 86 in the end of which is a longitudinal hexagon wrench opening 88. Attach bolt 74 and spherical head bolt 82 are formed into swivel bolt 72 by means of spherically hollow acorn nut 92 which houses spherical head 84 and which has hole 94 in the apex of the acorn through which shank 86 passes. Hole 94 is enough larger than shank 86 to permit swivel motion between the spherical head bolt 82 and acorn nut 92. The acorn nut 92 is threaded internally for engagement with threaded head 76 of attach bolt 74.

Referring to FIG. 3 and FIG. 6 leveling plate 52 contains a plurality of cavities 96 into the bottom of which is cut circular hole 98. Nested within each cavity 96 is adjusting fork 100 which consists of a plate 102 somewhat narrower and shorter than cavity 96 and with attached circular boss 104 which has an outside diameter smaller than hole 98 into which it enters. Boss 104 is threaded internally to receive adjusting screw 108. Plate 102 of adjusting fork 100 is somewhat shorter than cavity 96 and terminates at each end in elongated slots 106. Adjusting screw 108 comprises a threaded diameter 101 for engagement with internally threaded boss 104 of adjusting fork 100 and hexagon head 110 for engagement with a wrench when making adjustments. Adjusting screw 108 contains a bore on the longitudinal axis for slidably receiving threaded shank 86 of the spherical head bolt 82. The longitudinal bore through adjusting screw 108 terminates in spherical radius 112 which engages with the external spherical portion of acorn nut 92. Cover plate 114 which nests into and fills counterbore 118 has an opening 116 somewhat larger than the diameter of adjusting screw 108 which passes through the opening. Adjusting fork 100 is rigidly held to leveling plate 52 by means of screws 120 which pass through cover plate 114 and the elongated slots 106 of adjusting fork 100 to engage with threads in leveling plate 52 as shown.

Plate assembly 30 is attached to the curved work piece or skin 70 by attaching swivel bolts 72 in a manner previously described. The plate assembly may then be leveled and located by freeing nut 90 and screws 120 which will permit motion of swivel bolt 72, the raising and lowering of adjusting screw 108 and the shifting of the adjusting fork 100 within cavity 96. After the plate has been leveled and located, the adjustment is firmed by tightening screws 120 and also by tightening nut 90 while preventing swivel bolt 72 from turning by means of an Allen type wrench engaging wrench opening 88. The template may be oriented and located relative to the position of the hole to be remachined by means of gage or locating blocks, or other means well known to the art, none of which are shown or claimed as part of this invention. If desired, after the leveling plate adjustment is firmed in the manner described above, threaded stabilizing screws 122 as shown on FIG. 1 may be brought into contact with the work piece. This milling machine may be used on plane surfaces in which case the swivel mounts shown on FIG. 6 may be omitted if desired, and plate assembly 30 may be bolted or otherwise held directly against the work piece.

Referring to FIG. 2, FIG. 4 and FIG. 11 fixture 20 has a body ring 22 preferably made of magnesium or other lightweight metal. Journaled within body ring 22 is rotary plate 32 also preferably made of lightweight material which is rotated by ring gear 38 attached to rotary plate 32 by means of screws 40. Rotary plate 32 has lightening holes 34 as shown on FIG. 2. Retaining ring 42 as shown on FIG. 4 is of the same general outside diameter as body ring 22 and is attached to the body ring by means of screws not shown. The inside diameter of retaining ring 42 is of a convenient diameter less than the root diameter of the ring gear and provides a bearing surface for the weight of the rotary plate 32 and components mounted thereon. Body ring 22 has an undercut 24 as shown on FIG. 11 to provide relief for the corner of the teeth on ring gear 38. Means well known to the art may be provided for the lubrication of the ring gear and journaled rotary plate.

Referring to FIG. 1, FIG. 2 and FIG. 8 ring gear 38 is driven by pinion gear 44 which is journaled in bearing 46 retained within body ring 22. Mounted to the upper face of body ring 22 is bracket 48, held in place by screws 50. Attached to bracket 48 is a commercially available air motor 124 such as number 7412-BS manufactured by Aro Equipment Corporation of Bryon, Ohio. Air motor 124 through reduction gears and overload slip clutch 126, which is also commercially available, drives pinion 44 which in turn drives ring gear 38.

Referring to FIG. 1, FIG. 2, FIG. 4 and FIG. 9 upper cross slide 128 and lower cross slide 134 bear on shims 140 as shown on FIG. 9 and are guided an restrained by rails 142 as best shown on FIG. 1 and FIG. 2. Rails 142 are joined to rotary plate 32 by means of screws 146 as shown on FIG. 2 and FIG. 9. Upper cross slide 128 and lower cross slide 134 are preferably made of gray iron. Shims 140 are preferably made of ground flat stock steel. Upper cross slide 128 has beveled edges 130 and 132 as shown on FIG. 9. Lower cross slide 134 has like beveled edges 136 and 138. Rails 142 have mating level edges 144 which slidably engage the bevel edges on cross slides 128 and 134 as shown on FIG. 9 to guide and restrain the cross slides. If desired, taper gibs may be provided to adjust the clearance between the slides and the rails. Such taper gibs are well known to the art, are not shown on the drawings and are not claimed as part of this invention.

Perpendicular to upper cross slide 128 and lower cross slide 134, and on a common vertical center line are threaded housing ring 148 attached to upper cross slide 128, and template guide ring 156 attached to lower cross slide 134. Template guide ring 156 has a follower 158 which engages template 54 in a manner and for a purpose hereinafter described, and a flange 160 which nests within a counterbore in lower cross slide 134 as shown on FIG. 9 where it is held in place by screws or other means not shown. Template guide ring 156 has bore 162 for slidably journalling depth adjusting sleeve 164. Housing ring 148 has shank 150 which passes through upper cross slide 128 and a flange 152 which rests against slide 128 as shown on FIG. 9. Housing ring 148 is joined to upper cross slide 128 by means of screws 129 as shown on FIG. 2. Housing ring 148 has internal threads 154 for receiving the threaded portion of depth adjusting sleeve 164.

Depth adjusting sleeve 164 which is best shown on FIG. 4 and FIG. 9 is used to control the depth of a cutting tool in a manner to be hereinafter described and to house the drive spindle 174. Drive spindle 174 is journalled in two anti-friction bearings 180 which are retained by light press-fit within counterbores 166 of sleeve 164. Drive spindle 174 at its lower end terminates in shoulder 176 which prevents longitudinal movement of lower bearing 180 and which also has wrench flats for preventing rotation when cutters are attached to or removed from the drive spindle. The upper bearing 180 is retained by nut 181 which engages threaded end 178 of drive spindle 174. Internal bore 168 of sleeve 164 being of a diameter smaller than counterbores 166 provides shoulders 170 to retain drive spindle 174 and bearings 180 within sleeve 164. Interchangeable cutters 182 such as shown on FIG. 4 may be removably attached to the lower end of drive spindle 174 by means well known to the art, means which are not shown and are not claimed as part of this invention.

Powering means, as for example, an air motor 184 such as the Champing 2RH manufactured by the Buckeye Tool Corporation of Dayton, Ohio may be used to drive the spindle 174. The rotating shaft of the air motor 184 is connected to the threaded end of the spindle by any convenient method, and the threaded end of the air motor, body is screwed into the internal thread 172 of sleeve 164. As shown on FIG. 1 and FIG. 4 the rotary plate 32 contains an elongated slot 36 of sufficient length to permit the required sliding operation as established by template requirements.

Referring to FIG. 4, FIG. 7 and FIG. 9 graduated ring 186, which is internally threaded, is screwed onto the externally threaded portion of the depth adjusting sleeve 164 where it is locked in place by set screw 165. A pointer 188 is attached to the housing ring 148 as shown on FIG. 7 by means of screws 190. The pointer establishes an index for reading the graduations on the graduated ring 186. The number of graduations scribed on the ring 186 and their numerical value is dependent upon the number of threads per inch in threaded bore 154, of housing ring 148 and the mating external thread on depth adjusting sleeve 164. For example: if there are twenty threads per inch, each revolution of the adjusting sleeve would advance the cutter .050 inch. Therefore the graduated ring 186 would be scribed with fifty equally spaced lines, each of which would indicate .001 inch of longitudinal motion.

Upper cross slide 128 and all items joined thereto either directly or indirectly are moved longitudinally within rails 142 by means of air cylinder assembly 192.

Referring to FIG. 2, FIG. 4 and FIG. 5 air cylinder assembly 192 has a cylinder 194 externally threaded on both ends with threads 196. Within cylinder 194 is piston 198 threadably attached to piston rod 200 and carrying O-ring 202 to prevent excessive air leakage past the piston. The front end of cylinder 194 is closed with head cap 204 which is internally threaded to cooperate with thread 196 of the cylinder. Head cap 204 is bored on its axial center to provide an opening for piston rod 200. The rear end of cylinder 194 is closed with tail cap 206 which is internally threaded to cooperate with thread 196 of the cylinder. The tail cap 206 has a passage 208 for the introduction of air into the cylinder behind the piston. A small bleed hole 210 is located toward the rear of cylinder 194 and is drilled through the cylinder wall. Tail bracket 212 is attached to the rear of tail cap 206 by means of screws 214 and to rotary plate 32 by means of screws 216. Support bracket 218 has its upright leg bored to provide a free fit around the outside diameter of cylinder 194 and is attached to the end of upper cross slide 128 as shown on FIG. 2 by means of screws 220. Connector stud 222 is joined to housing ring 148 by means of a screw thread as shown on FIG. 4. The free end of piston rod 200 is joined to the free end of connector stud 222 by means of pin 224. Compression spring 226 surrounds cylinder 194 in the area between head cap 204 and the support bracket 218 as shown on FIG. 5

In operation, air is admitted into cylinder 194 through passage 208 to push on piston 198 and advance upper cross slide 128 until either cutter 182 engages work piece 70 or, until the follower 158 of guide ring 156 bears against contoured edge 58 of template 54. Compression spring 226, which is biased to hold guide ring 156 out of engagement with template 54, is further compressed when the piston is moved by the air pressure. When air valve 228, which controls the flow of air from air line 230 into cylinder assembly 192 is closed, the air trapped within the cylinder will escape through bleed hole 210. This reduction in pressure will allow the compression spring 226 to return the piston 198 to its free position. The bleed hole 210 also prevents a pressure rise within the cylinder when the template contour is such that the piston is forced to "back-up" during the machining operation. Suppose for example the air supply is regulated to 30 p.s.i. The air pressure within the cylinder would be at 30 p.s.i. so long as the incoming air flow can exceed the outflow through bleed hole 210. Without the bleed hole, when the piston started to "back-up" the regulator would close to prevent backflow and the piston would compress the trapped air to thereby produce a pressure rise. With bleed hole 210 however, a constant regulated pressure is maintained regardless of piston motion during the machining cycle.

Referring to FIG. 1, FIG. 2, FIG. 3 and FIG. 10, after plate assembly 30 has been properly located and leveled on the work piece, the fixture assembly 20 is placed on locating bolts 62 and held firmly in place with spherical nuts 232. Locating bolts 62 have a hexagon shoulder 64 to provide a wrench grip and of a given length to establish the distance between fixture assembly 20 and plate assembly 30. Each locating bolt 62 has a threaded stud 66 which is screwed into a companion thread in leveling plate 52 and shank 68 which passes through hole 26 in body ring 22. Shank 68 is threaded on the end to engage with threaded spherical nut 232. Hole 26 in body ring 22 terminates in a spherical seat 28 to receive spherical nut 232. Spherical nut 232 has a hexagon wrench grip 234 and spherical end 236 which engages with spherical seat 28 in body ring 22.

Cutter 182 is representative of the various types and sizes of cutters which may be used with this invention. Such cutters may include side cutters, end cutters and profile cutters. Various types of cuts may be made without invention including straight hole cuts, face cuts, counterbores and profile cuts.

The determination between the size of the finished cut to the size of the machine elements such as templates, guides and cutters is done in the manner well known to the art.

When holes are machined which require the use of more than one cutter or template, these elements may be changed without disturbing the setup of the plate assembly on the work piece.

A common source of air, such as the air supply in a factory or machine shop, may be used to power the two air motors and the cylinder assembly. It would be desirable to have an individual regulator to control the air going to each unit in order to change the air pressure to fit various conditions. For example, the air motor driving the cutter will require greater air pressure when taking a heavy cut than when taking a light cut. Also, the rate of feed may be controlled by the pressure of the air entering the air motor driving the rotary plate. A lubricator should be placed in the air supply to lubricate the air motors.

It is to be understood that the embodiment of the present invention as shown and described is to be regarded as illustrative only and that the invention is susceptible to variations, modifications and changes within the scope of the appended claims.

We claim:

1. A machine for generating holes and the like comprising: a plate assembly and a fixture assembly removably mounted in fixed relationship with said plate assembly; said plate assembly comprising a leveling plate, means for attaching said leveling plate to a work piece, an interchangeable template removably joined to said leveling plate and having an internal cut-out with contoured edge for controlling the shape and size of the generated holes; said fixture assembly comprising a body ring, a rotary plate journaled within said body ring, means for rotating said rotary plate, a cross slide slidably mounted to said rotary plate, said cross slide having joined thereto a drive spindle, a cutter removably joined to one end of and driven by said drive spindle, means for axially moving said drive spindle, and guide means for engaging the contoured edge of said template and thereby determining the position of said drive spindle in relation to the work piece; means for driving said drive spindle, resilient means biased to hold said guide means out of engagement with said template and means for overpowering said resilient means to thereby bring said guide means in engagement with said template.

2. A machine for generating holes and the like comprising: a plate assembly and a fixture assembly removably mounted in fixed relationship with said plate assembly; said plate assembly comprising a leveling plate, means for attaching said leveling plate to a work piece, an interchangeable template removably joined to said leveling plate and having an internal cut-out with contoured edge for controlling the shape and size of the generated holes; said fixture assembly comprising a body ring, a rotary plate journaled within said body ring, a ring gear joined to said rotary plate, a pinion gear journaled within said body ring and engaging said ring gear, means for rotating said rotary plate through said ring gear and pinion, a cross slide slidably mounted to said rotary plate, said cross slide having joined thereto a drive spindle, a cutter removably joined to one end of and driven by said drive spindle, threaded means for axially moving said drive spindle, and guide means for engaging the contoured edge of said template and thereby determining the position of said drive spindle in relation to the work piece; means for driving said drive spindle, a spring biased to hold said guide means out of engagement with said template and means for overpowering said spring to thereby bring said guide means in engagement with said template.

3. A machine for generating holes and the like comprising: a plate assembly and a fixture assembly removably mounted in fixed relationship with said plate assembly; said plate assembly comprising a leveling plate, a plurality of swivel mounts for attaching and leveling said leveling plate to a work piece, an interchangeable template removably joined to said leveling plate and having an internal cut-out with contoured edge for controlling the shape and size of the generated holes; said fixture assembly comprising a body ring, a rotary plate journaled within said body ring, a ring gear joined to said rotary plate, a pinion gear journaled within said body ring and engaging said ring gear, means for rotating said rotary plate through said ring gear and pinion, a cross slide slidably mounted for radial movement on said rotary plate, said cross slide having joined thereto a drive spindle, a cutter removably joined to one end of and driven by said drive spindle, a threaded depth adjusting sleeve, said drive spindle being journaled in fixed axial relationship within and moving axially with said threaded depth adjusting sleeve, and guide means for engaging the contoured edge of said template and thereby determining the position of said drive spindle in relation to the work piece; means for driving said drive spindle, a spring biased to hold said guide means out of engagement with said template, and means for overpowering said spring to thereby bring said guide means in engagement with said template.

4. A machine for generating holes and the like comprising: a plate assembly and a fixture assembly removably mounted in fixed relationship with said plate assembly; said plate assembly comprising a leveling plate, a plurality of swivel mounts for attaching and leveling said leveling plate to a work piece, said swivel mounts being slidably adjustable on said leveling plate, an interchangeable template removably joined to said leveling plate and having an internal cut-out with contoured edge for controlling the shape and size of the generated holes; said fixture assembly comprising a body ring, a rotary plate journaled within said body ring, a retaining ring for retaining said rotary plate within said body ring, a ring gear joined to said rotary plate, a pinion gear journaled within said body ring and engaging said ring gear, means for rotating said rotary plate through said ring gear and pinion, a cross slide slidably mounted for radial movement on said rotary plate, said cross slide having joined thereto on an axis perpendicular to said rotary plate, a drive spindle, a cutter removably joined to one end of and driven by said drive spindle, a threaded depth adjusting sleeve, said drive spindle being journaled in fixed axial relationship within and moving axially with said threaded depth adjusting sleeve, and guide means for engaging the contoured edge of said template and thereby determining the position of said drive spindle in relation to the work piece; means for driving said drive spindle, a spring biased to hold said guide means out of engagement with said template, and means for overpowering said spring to thereby bring said guide means in engagement with said template.

5. A machine for generating holes and the like comprising: a plate assembly and a fixture assembly; said plate assembly comprising a leveling plate, a plurality of swivel mounts for attaching and leveling said leveling plate to a work piece, said swivel mounts being slidably adjustable on said leveling plate, an interchangeable template removably joined to said leveling plate and having an internal cut-out with contoured edge for controlling the shape and size of the generated holes; said fixture assembly comprising a body ring, a rotary plate journaled within said body ring, a retaining ring for retaining said rotary plate within said body ring, a ring gear joined to said rotary plate, a pinion gear journaled within said body ring and engaging said ring gear, means for rotating said rotary plate through said ring gear and pinion, a cross slide slidably mounted for radial movement on said rotary plate, said cross slide having joined thereto on an axis perpendicular to said rotary plate, a drive spindle, a cutter removably joined to one end of and driven by said drive spindle, a threaded depth adjusting sleeve, said drive spindle being journaled in fixed axial relationship within and moving axially with said threaded depth adjusting sleeve, and guide means for engaging the contoured edge of said template and thereby determining the position of said drive spindle in relation to the work piece; means for driving said drive spindle, a spring biased to hold said guide means out of engagement with said template, and means for overpowering said spring to thereby bring said guide means in engagement with said template; said fixture assembly being removably mounted in fixed relationship with said plate assembly by means of a plurality of shouldered locating bolts, said locating bolts being threadably joined to said leveling plate and having threaded shanks slidably passing through mating holes in said body ring to permit the body ring to rest on the shoulders of said locating bolts, and a plurality of threaded nuts engaging the threaded shanks of said locating bolts to secure the fixed relationship between said plate assembly and said fixture assembly.

6. A machine for generating holes and the like comprising: a plate assembly and a fixture assembly; said plate assembly comprising a leveling plate, a plurality of swivel mounts for attaching and leveling said leveling plate to a work piece, said swivel mounts being vertically adjustable for spaced relationship between said leveling plate and said work piece and slidably adjustable on said leveling plate for lateral adjustment of said leveling plate on said work piece, an interchangeable template removably joined to said leveling plate and having an internal cut-out with contoured edge for controlling the shape and size of the generated holes; said fixture assembly comprising a body ring, a rotary plate journaled within said body ring, a retaining ring for retaining said rotary plate within said body ring, a ring gear joined to said rotary plate, a pinion gear journaled within said body ring and engaging said ring gear, an air motor terminating in an overload slip clutch and reduction gear for rotating said rotary plate through said ring gear and pinion, a cross slide slidably mounted for radial movement on said rotary plate, said cross slide having joined thereto on an axis perpendicular to said rotary plate a drive spindle, a cutter removably joined to one end of and driven by said drive spindle, a threaded depth adjusting sleeve, said drive spindle being journaled in fixed axial relationship within and moving axially with said threaded depth adjusting sleeve, a graduated ring joined to said threaded depth adjusting sleeve, said graduated ring being circumferentially graduated to indicate the axial movement per revolution of said threaded depth adjusting sleeve, a guide ring for engaging the contoured edge of said template and thereby determining the position of said drive spindle in relation to the work piece, and an air motor mounted to said threaded depth adjusting sleeve for powering said drive spindle; a pointer for establishing an index for reading said graduated ring, a spring biased to hold said guide ring out of engagement with said template, and an air cylinder assembly for overpowering said spring to thereby bring said guide ring in engagement with said template; said fixture assembly being removably mounted in fixed relationship with said plate assembly by means of a plurality of shouldered locating bolts, said locating bolts being threadably joined to said leveling plate and having threaded shanks slidably passing through mating holes in said body ring to permit the body ring to rest on the shoulders of said locating bolts, and a plurality of threaded nuts engaging the threaded shanks of said locating bolts to secure the fixed relationship between said plate assembly and said fixture assembly.

References Cited in the file of this patent

UNITED STATES PATENTS

| 1,795,323 | Wade et al. | Mar. 10, 1931 |
| 2,823,590 | Swanson et al. | Feb. 18, 1958 |
| 2,837,973 | Dunlap | June 10, 1958 |

FOREIGN PATENTS

| 247,679 | Great Britain | Feb. 25, 1926 |